US006344837B1

(12) United States Patent
Gelsey (10) Patent No.: US 6,344,837 B1
(45) Date of Patent: Feb. 5, 2002

(54) THREE-DIMENSIONAL IMAGE DISPLAY WITH PICTURE ELEMENTS FORMED FROM DIRECTIONALLY MODULATED PIXELS

(76) Inventor: Andrew H. Gelsey, 5 Princeton Pl., Princeton Junction, NJ (US) 08550

( * ) Notice: Subject to any disclaimer, the term of this patent is extended or adjusted under 35 U.S.C. 154(b) by 0 days.

(21) Appl. No.: 09/596,010

(22) Filed: Jun. 16, 2000

(51) Int. Cl.[7] .................................................. G09G 5/00
(52) U.S. Cl. ............................... 345/6; 345/20; 345/33
(58) Field of Search ................................. 345/6, 40, 33, 345/34, 35, 20, 14, 39; 348/53, 54; 359/465, 462

(56) References Cited

U.S. PATENT DOCUMENTS

| | | | |
|---|---|---|---|
| 4,473,848 A | * 9/1984 | Juergensen | 358/296 |
| 4,901,064 A | 2/1990 | Deering | |
| 5,287,437 A | 2/1994 | Deering | |
| 5,369,511 A | * 11/1994 | Amos | 359/107 |
| 5,440,426 A | * 8/1995 | Sandstrom | 359/559 |
| 5,574,836 A | 11/1996 | Broemmelsiek | |
| 5,678,095 A | 10/1997 | Takezaki | |
| 5,682,506 A | 10/1997 | Corby, Jr. | |
| 5,768,002 A | * 6/1998 | Puzey | 359/245 |
| 5,781,229 A | 7/1998 | Zediker | |
| 5,786,822 A | 7/1998 | Sakaibara | |
| 5,831,619 A | 11/1998 | Nakagawa | |
| 5,880,704 A | 3/1999 | Takezaki | |
| 5,923,330 A | 7/1999 | Tarlton | |
| 5,936,774 A | 8/1999 | Street | |
| 5,946,077 A | 8/1999 | Nemirovskiy | |
| 5,966,132 A | 10/1999 | Kakizawa | |
| 5,973,699 A | 10/1999 | Kent | |
| 6,009,210 A | 12/1999 | Kang | |
| 6,016,147 A | 1/2000 | Gantt | |
| 6,087,655 A | * 7/2000 | Kobrin | 250/237 |
| 6,201,565 B1 | * 3/2001 | Balogh | 348/40 |

OTHER PUBLICATIONS

L. MacFarlane; Volumetric three– dimensional display; Applied Optics,11/94 vol. 33 No. 31 pp. 7453–7457.
B.G. Blundell and Warren King; Outline of a Low–Cost Prototype System to Display Three–Dimensional Images; IEEE Transactions On Instrumentation and Measurement, 8/99, vol. 40, No. 4, pp. 792,793.

* cited by examiner

*Primary Examiner*—Richard Hjerpe
*Assistant Examiner*—Abbas Abdulselam
(74) *Attorney, Agent, or Firm*—Kenneth Watov; Watov & Kipnes (57) ABSTRACT

A three-dimensional image display system includes an array of directionally-modulated pixels or light emitting picture elements. Each directionally-modulated pixel (DMP) emits light which is modulated in a manner that is not uniform in all directions, to insure that the light emitted in each included direction is appropriate for the scene being displayed. In this manner, observers viewing the scene from various positions see a scene generated by the image display device that closely simulates the three-dimensional attributes of the real objects located in the real scene being reproduced. In one embodiment of the invention, each directionally-modulated pixel is provided by locating a point source of light behind a microminiature array of liquid crystal device (LCD) elements, each of which are operated by a control device programmed to vary the light transmission characteristics of each element at a given time for passing light through that element in a manner modulating the light to reproduce the intensity of the light representative of substantially the same intensity of light emitted from the actual scene at the same coordinate position.

53 Claims, 10 Drawing Sheets

THREE-DIMENSIONAL IMAGE DISPLAY WITH PICTURE ELEMENTS FORMED FROM DIRECTIONALLY MODULATED PIXELS

FIELD OF THE INVENTION

The field of the present invention relates generally to image display devices, and more particularly to three-dimensional image display devices.

BACKGROUND OF THE INVENTION

In the prior art much development has been pursued for providing a practical three-dimensional image display to provide a virtual image of a real scene. None of the image display devices and methodology therefor have thus far been proven sufficiently satisfactory and practical for widespread general use. Stereoscopic, and holographic devices and systems have been developed for displaying 3D images. However, each of these developments suffer various deficiencies. For example, stereoscopic systems do provide depth perception, but do not provide other 3D properties such as occlusion of a portion of a scene dependent upon viewing direction. Holographic systems utilize optical properties of interference and diffraction to coherent (laser) light for providing 3D images, but with the present state of technology are extremely difficult to use for producing moving three-dimensional images, and presently are not practical for widespread use.

Attempts have been made for developing volumetric display methods for forming an image within a three-dimensional volume. Also, three-dimensional images have been developed that are based upon integral photography images using fly's eye lenses or lenticular sheets. Apparatus has also been developed for recording and reproducing 3D images comprising opaque surface having multiple transmission points, a transparent refracting body, and a recording surface. A 3D image display device has been developed comprising a screen shutter unit, a shutter control unit, a display unit, and a display control unit. None of these approaches have proven satisfactory, as previously mentioned.

SUMMARY OF THE INVENTION

An object of the invention is to provide improved three-dimensional imaging displays.

Another object of the invention is to provide improved methods and apparatus for a three-dimensional image display for producing virtual images of a real world scene that provide to observers all of the key properties of the actual scene, such as occlusion depending upon the direction of viewing by a particular observer, along with a perception of the distance of various objects from each observer.

Yet another object of the invention is to provide a three-dimensional image display capable of displaying three-dimensional images having the properties of real 3D scenes such as occlusion and depth perception, along with color changes depending upon the viewing angle.

In one embodiment of the invention, these and other objects are provided in a three-dimensional image display that includes a plurality of picture elements, each of which is controllable for emitting light, and which are arranged into a closely spaced array thereof, with each picture element representing a pixel of a displayed image. The light emitted from each of the picture elements is directionally modulated, for independently controlling the visual properties of light emitted therefrom in a plurality of directions, respectively, to match the visual properties of light passing through corresponding points in corresponding ones of the plurality of directions, respectively, relative to an actual three-dimensional scene being displayed.

BRIEF DESCRIPTION OF THE DRAWINGS

Various embodiments of the present invention will be described below with reference to the drawings, in which like elements are identified by the same reference designation wherein.

DETAILED DESCRIPTION OF THE INVENTION

Figure 1:
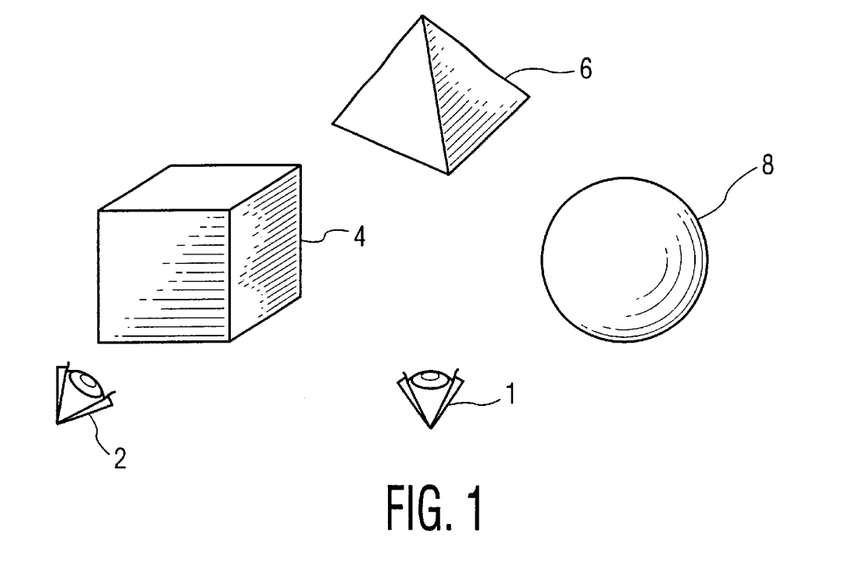
FIG. 1 shows a simplified three-dimensional real world scene as observed by several observers looking at the scene at different viewing angles.

A key property of the three-dimensional (3D) real world is that several observers looking at the same scene will see different parts of the objects in the scene and may even see somewhat different sets of objects. For example, in FIG. 1, observer 1 sees three objects 4, 6, and 8, but cannot see the left side of the square object 4, while observer 2 only sees two objects 4, and 8, as his view of the triangular object 6 is occluded by the square object 4, but 2 can see the left side of the square object 4 which is not visible to observer 1. An additional property of such a real 3D scene is that an observer with two eyes will see slightly different views of the scene from each eye and the brain will use these differences to create a perception of the distance of the various objects from the observer. The present invention is a means of displaying 3D images having properties of real 3D scenes such as occlusion and depth perception as described above.

Figure 2:
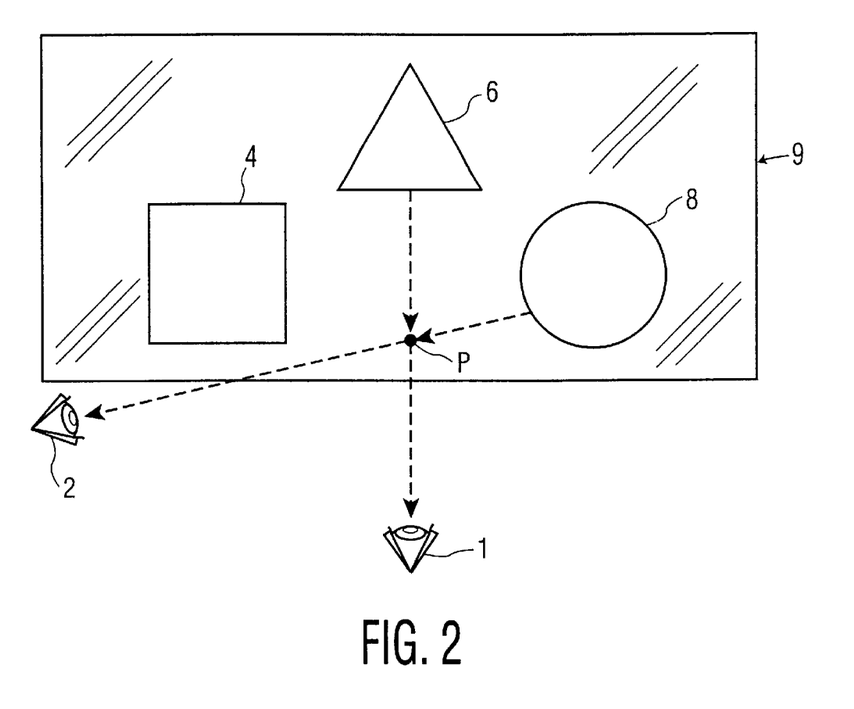
FIG. 2 shows the scene of FIG. 1, but with an imaginary surface located between the objects and the observers.

FIG. 2 shows the same scene but with an imaginary surface 9 shown between the objects and the observers. The previously listed properties of the 3D scene may also be considered to be properties of the wavefront of light from the objects passing through the imaginary surface 9, and if the objects were removed from the scene and an alternative means substituted to generate the same wavefront of light passing through surface 9, then the scene would appear unchanged to the observers, and the 3D properties listed above would still hold. A key property of the wavefront of light passing through the imaginary surface 9 is that the light passing through any given point of surface 9 will not be uniform in all directions. For example, the light passing through the same point P in the direction of observer 2 comes from the round object 8 rather than from the triangular object 6, and in fact observer 2 cannot see any part of the occluded triangular object 6 at all.

Figure 3:
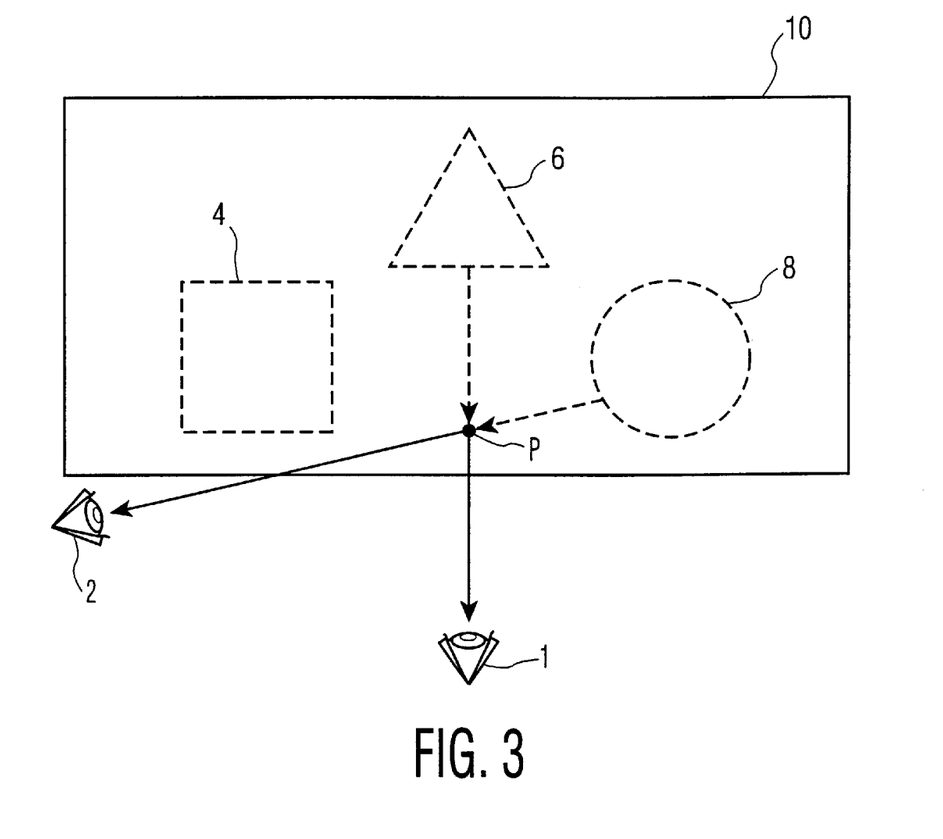
FIG. 3 shows the same scene as FIG. 2, except that the imaginary surface is replaced with an image display device (IDD).

In FIG. 3, the imaginary surface has been replaced with an image display device (IDD) 10 which is one embodiment of the invention. The objects 4, 6, and 8 are no longer physically present in the scene, but to the observers the objects will appear to be visible and to possess the 3D properties listed earlier. The various embodiments of the invention achieve this goal by forming the image display device (IDD) 10 from a closely spaced collection of directionally-modulated pixels picture elements), which are discussed in detail below. For example, the directionally-modulated pixel (DMP) at point P in FIG. 3 emits light which is modulated in such a way that the light emitted is not uniform in all directions, but rather the light emitted in each direction is appropriate for the scene being displayed. Accordingly, in FIG. 3 the light emitted by the DMP at point P in the direction of observer 1 has the visual properties of the light from the triangular object 6 that observer 1 would have seen if the objects themselves were present in the scene instead of the IDD 10, and the light emitted by the same DMP at the same point P in the direction of observer 2 has the different visual properties of the light from the round object 8 that observer 2 would have seen if the objects themselves were present. The observers' views of the scene generated by IDD 10 shares the 3D behavior of the real objects: and observer 2 can see the left side of the square object 4 which is occluded for observer 1. Additionally, if the DMPs are spaced sufficiently closely, the two eyes of each observer will see slightly different view of the scene and thus will provide depth perception.

Figure 4A:
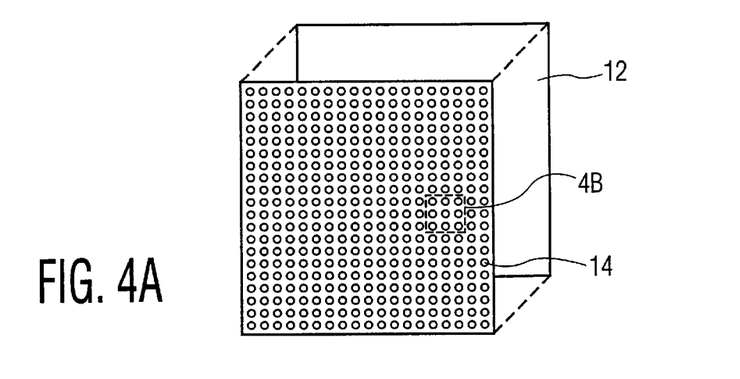
FIG. 4A shows a portion of an image display device including a rectangular array of directionally-modulated pixels for an embodiment of the invention.
Figure 4B:
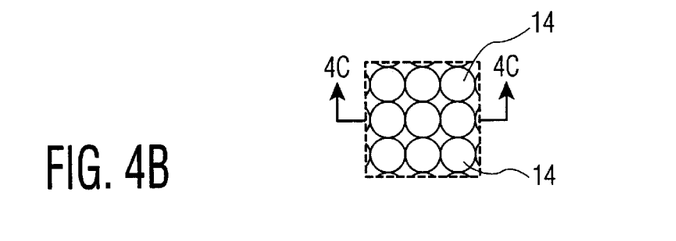
FIG. 4B is a detailed view showing the packing density of a small group of directionally modulated pixels of the image display device of FIG. 4A, for one embodiment of the invention.

In FIG. 4A, an image display device (IDD) 12 for one embodiment of the invention is shown. The front of the IDD 12 includes an array of directionally-modulated pixels (DMPs) 14. Each of these DMPs 14 includes a point source of light 15 (see FIG. 4C), which can be provided by an individual fiberoptic strand or cable routed through a backplane of the IDD 12 (the configuration of which is not shown for the sake of simplicity). A typical IDD 12 may include a rectangular array of 500×500 directionally-modulated pixels or DMPs 14, which are closely packed together, as shown in the enlarged view of FIG. 4B. As shown in the latter, the DMPs 14 are configured in rows and columns with minimum spacing therebetween. Note also that the electronic circuitry for controlling the modulation of the DMPs 14 is also contained within the IDD 12.

It is instructive to contrast image display device IDD in FIG. 4A with a conventional image display device whose pixels emit light uniformly in all directions, such as a conventional computer monitor, or even a painting or photograph. In the conventional case, the light from the pixels may be arranged to imitate the light from real objects as viewed by at most a single observer. Since conventional pixels emit light uniformly in all directions, all other observers will see the same light from each pixel. For example, if the conventional pixels emit light correctly for view by observer 1, the triangular object 6 will be visible not only for observer 1, but also for all other observers, so occlusion will not depend on viewing direction as it does for a real 3D scene. In contrast, the present invention's use of directionally-modulated pixels 14 allows different observers to see different light from the same pixel, thus allowing visual properties of the scene such as occlusion to depend on viewing direction as it does for real 3D scenes.

Figure 4C:
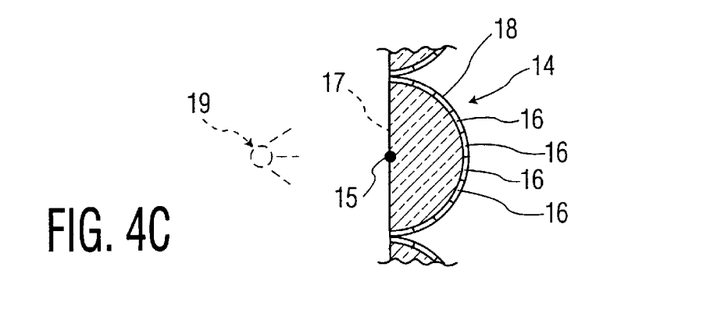
FIG. 4C shows a cross-sectional view taken along 4C—4C of FIG. 4B for an individual directionally modulated pixel, for an embodiment of the invention.
Figure 4D:
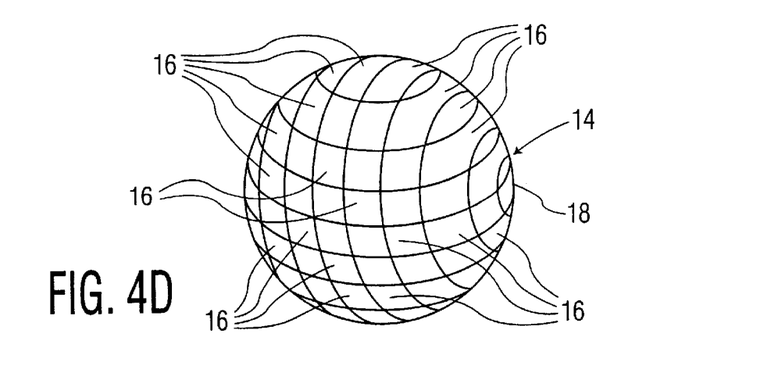
FIG. 4D shows a front perspective view of the directionally modulated pixel element of FIG. 4C for an embodiment of the invention.
Figure 5:
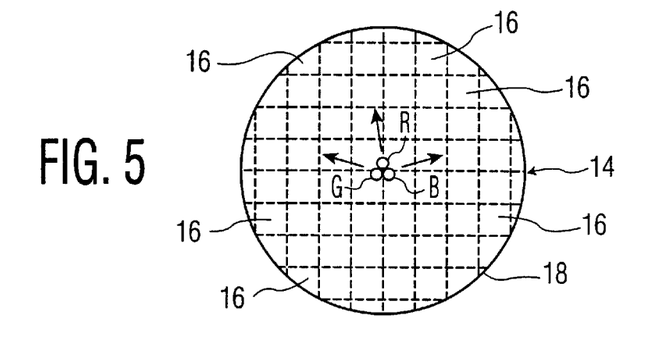
FIG. 5 shows a rear elevational view picture element including multiple point sources of light, for another embodiment of the invention.

In FIG. 4C, a sectional view of a DMP 14 shows that it consist of a centrally located point source of light 15 within a semi spherical shell 18 formed from a plurality of liquid crystal material (LCD) modulation regions 16. A pictorial or perspective view of a DMP 14, for this embodiment of the invention, is shown in FIG. 4D. The LCD shell 18 is a modulation surface subdivided into numerous modulation regions 16 as shown. Each LCD modulation region 16 is individually controlled by an electronic control system for controlling the light transmissive properties or transparency of each region 16 at any given time, for controlling or modulating the intensity of light permitted to pass through a given modulation region 16 to an observer. The light emitted by the DMP 14 in the direction from the point source of light 15 through a given modulation region will have the visual properties imposed by that particular modulation region 16, and since each modulation region 16 may separately impose distinct visual properties on the light from the point source 15 traveling in its direction, the result is that the DMP 14 will emit nonuniform light with the light emitted in different directions having the different visual properties appropriate for the scene being displayed. As shown in FIG. 5, this embodiment of the invention can be extended to include multiple point sources of light as shown in this rear elevational view of a DMP 14. In the example shown, the three point sources of light R, G, and B, represent red, green, and blue point sources of light for providing a color display, whereby in this example the light sources would be multiplexed at a very rapid rate for activating only one of the three at a given time. If the emission of light is alternated rapidly between the different point sources of light R,G,B in the DMP 14, and the modulation of the regions of the modulation surface alternates correspondingly, then to the human eye light from the several point sources in the DMP 14 will appear to combine so that the single DMP 14 may imitate several distinct DMPs 14. However, other schemes of operation are contemplated where more than one of the multiple point sources of light may be activated at a given time.

With further reference to FIG. 4C, in another embodiment of the invention, an opaque baffle 17 is placed between a common light source 19 backlighting the baffle 17, and each of the LCD shells 18. The point source of light 15 for each LCD shell 18 is provided by a pin hole through a portion of the opaque baffle 17, with the pin hole being centrally located relative to its LCD shell 18. In certain applications the opaque baffle 17 may not be required. The common light source 19 can in certain applications be an incoherent light source, and in other applications a coherent light source.

In a preferred embodiment of the DMP 14 of FIG. 4D, each modulation region 16, in the modulation surface 18 can be a liquid crystal unit, as previously mentioned, or another type of electro-optical device capable of separately modulating the intensity of the light from the point source 15. The modulation of each of the modulation regions 16 is controlled by an appropriate control system such as one or more computer processors in conjunction with suitable interface circuitry. The point source of light 15 may emit either coherent light, such as light generated by a gas or diode laser, or incoherent light, such as light generated by an incandescent or fluorescent light source or by a conventional incoherent light emitting diode. In using the present invention to display 3D images, the control system could keep the modulation in all modulation regions 16 constant to display an unmoving 3D scene, or alternatively the modulation may be changed continuously by the control system in order to display moving or continuously changing 3D images. These aspects of the invention can be extended to other embodiments of the invention.

Various forms of time and/or space multiplexing may be used in conjunction with the invention. For example, the point light source 15 in the DMP 14 may alternate rapidly between several colors. The modulation regions 16 of modulation surface 18 may correspondingly alternate to appropriately modulate each color. If these alternations are sufficiently rapid, to the human eye the mix of colors will appear continuously present, and colored 3D images may be displayed. Alternatively, colored images may be displayed by closely spacing together DMPs 14 with light sources of different colors.

Figure 6A:
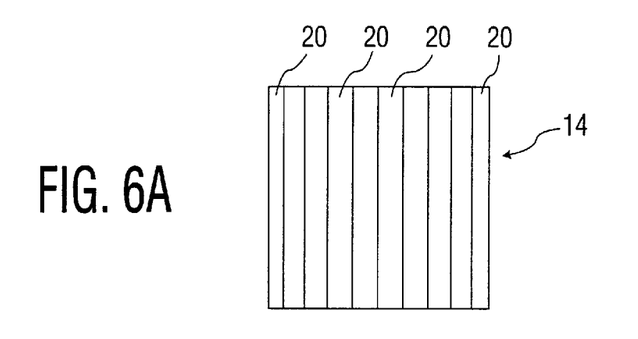
FIG. 6A shows a front elevational view of a directionally modulated pixel for another embodiment of the invention in which the modulation regions are formed from a horizontal row of individual vertically lengthened regions.
Figure 6B:
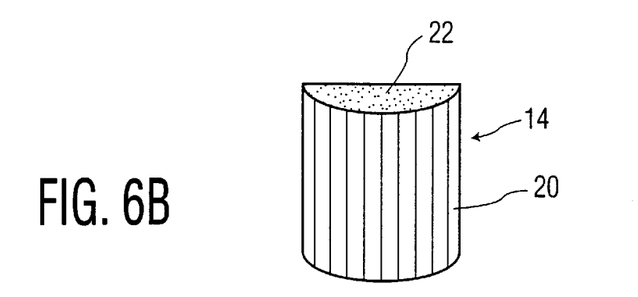
FIG. 6B shows a front perspective view of a directionally modulated pixel for an embodiment of the invention employing the configuration of a DMP of FIG. 6A.
Figure 6C:
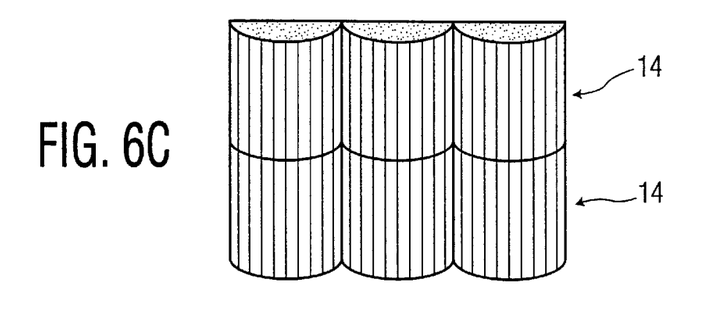
FIG. 6C shows an array of directionally modulated pixels each configured as in the DMP of FIG. 6B.

The directionally modulated pixels (DMP) 14, and other embodiments of the invention, can be provided in other than a spherical or hemispherical configuration. For example, in FIG. 6A for another embodiment of the invention, a DMP 14 is provided through use of a horizontal row of vertically lengthened modulation regions 20, which can be provided by LCD material, for example. As shown in the perspective view of FIG. 6B, each such DMP 14 can be provided in a curved configuration of the successive vertical modulations regions 20. The top portion of the DMP 14 includes a coating of opaque material 22, with a similar coating on the bottom portion (not shown). Such alternative DMP devices can provide an IDD in an array of a plurality of the same configure as shown in 6C. As shown, DMPs 14 are secured to one another in a stacked relationship in each column, and are abutted or secured to a adjacent DMP 14 in a successive manner in each row thereof. The opaque coating 22 formed on the top and bottom surfaces of each DMP 14, for this embodiment of the invention, prevents light from one DMP 14 from entering an adjacent DMP 14.

This arrangement will exhibit 3D image properties for observers distributed horizontally but not vertically. Such a restriction may prove economically justified for some applications. Other shapes of the modulation regions of the DMPs can be varied to limit 3D properties to certain viewing directions.

Figure 7:
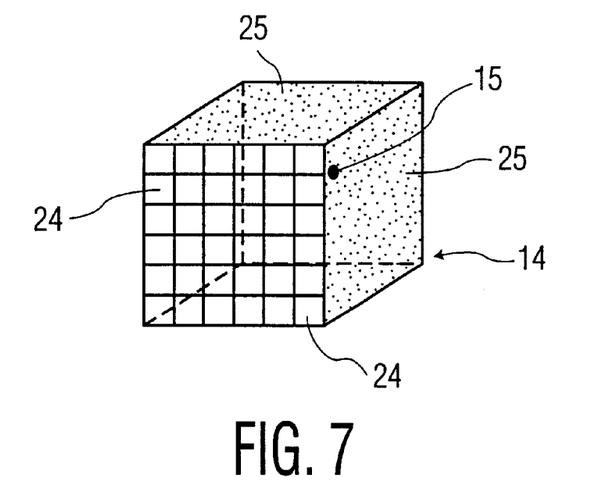
FIG. 7 shows a directionally modulated pixel in the form of a cube including a point light source for yet another embodiment of the invention.

The overall shape of a DMP can have many different forms. For example, in another embodiment of the invention, each DMP 14 can be provided in a cubical configuration as shown in FIG. 7. A point source of light 15 is located within a central region of the cubical DMP 14, and rectangular or square modulation regions 24 are formed in an X-Y grid configuration on the front of the DMP 14, as shown. Each region 24 can be provided by LCD material, as previously described for other DMP 14 embodiments. The choice of DMP shape may be based on economics and requirements for a given application. The key requirement is that light emitted in sufficiently different directions must be separately modulated by different modulation regions in the modulation surface, so that the overall light emitted by the DMP 14 will be nonuniform as appropriate for the scene being displayed. In addition, light passing through a given modulation region must come from only one point source of light, so the modulation region of a DMP 14 must be shielded from the light from neighboring DMPs 14. This can be accomplished, for example, by placing a layer of opaque material 25 on the side, top, bottom, and back surfaces of the cubical DMP 14. A plurality of such cubical DMPs 14 can be vertically stacked, and horizontally juxtaposed to provide the array for a 3D image display.

The shape of modulation regions in the modulation surface of a DMP may be nonuniform, varying in size or shape as appropriate for a given purpose. For example, finer resolution may be desired from certain viewing directions and coarser resolution from other viewing directions. The modulation of the properties of the light passing through each modulation region may be varied over time using electro-optical, acousto-optical, mechanical, or other modulation methods, or the modulation may be constant and the modulation regions may simply be constructed of materials having differing degrees of transparency, opacity, color, or other optical properties.

The point sources of light in each DMP 14 may be separately generated, or optical elements may be used to transfer light from a common source to appropriate points in several DMPs. The light may be generated in a variety of well-known ways, or may even be naturally occurring light such as sunlight.

Figure 8:
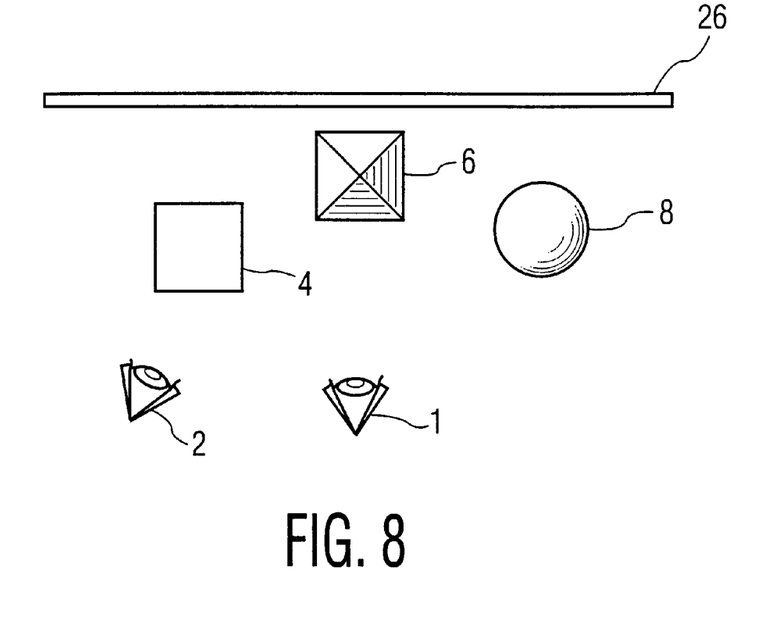
FIG. 8 is a top view showing an image display device of the present invention for projecting virtual objects that appear to be in front of the IDD relative to observers.

In the embodiment shown in FIG. 3, the objects 4, 6, 8 shown in the 3D scene appear behind the image display device IDD 10. However, the apparent positions of the objects 4, 6, 8 can equally well be between the ID 26 and the observers, and as shown in FIG. 8. To achieve this the IDD 26 will emit directionally modulated light corresponding to the light that would come from the objects 4, 6, 8 if they were actually in their apparent positions.

Figure 9A:
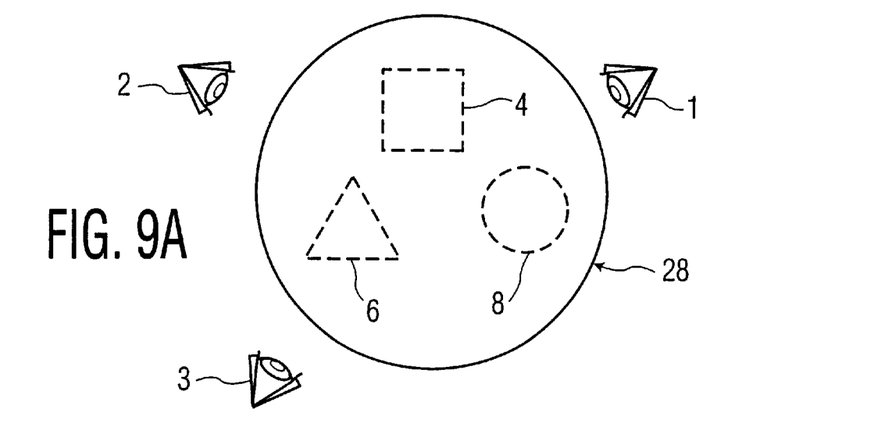
FIG. 9A shows an IDD of the invention for an embodiment where the observers look into the IDD to observe displayed objects for another embodiment of the invention.
Figure 9B:
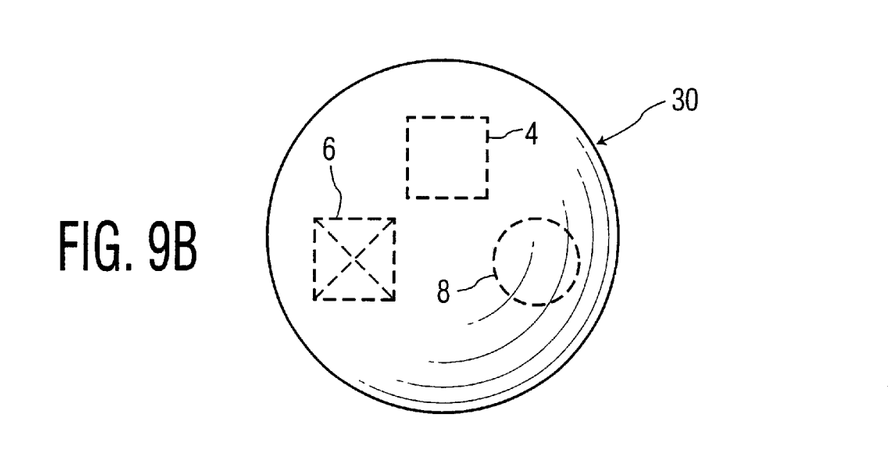
FIG. 9B shows the IDD for FIG. 9A in the form of a sphere.

In another configuration, as shown in FIG. 9A, an IDD 28 is formed of DMPs 14 in a circular configuration. The IDD 28 can be controlled for making it appear to observers 1, 2, and 3, in this example, that objects 4,6, and 8 are located within the interior of the IDD 28, as shown. Also as shown, each observer would have a different view of the scene being projected, as in other embodiments of the invention. The circular configuration can be extended to be in the form of a sphere or a hemisphere for an IDD 30 as shown in FIG. 9B, for an observer looking down on the scene being recreated.

Figure 10:
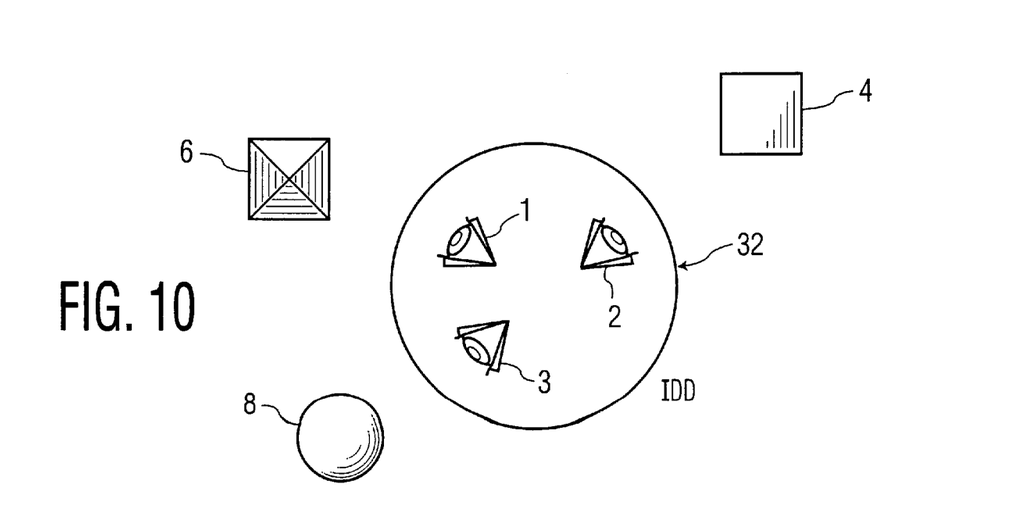
FIG. 10 shows an embodiment of the invention where the observers are located inside an image display device for viewing objects that appear to be on the outside of the image display device, such as a circular room in which the IDD forms the walls thereof, for another embodiment of the invention.

In FIG. 10, for another embodiment of the invention, an IDD 32 includes a plurality of DMPs 14 forming interior walls of a circular room, in which observers 1, 2, and 3, in this example, view objects 4, 6, and 8, that appear to be located outside the room. All of this is accomplished through appropriate control of the modulation regions of each DMP 14. Accordingly, an IDD can be either flat, curved, or spherical.

Figure 11A:
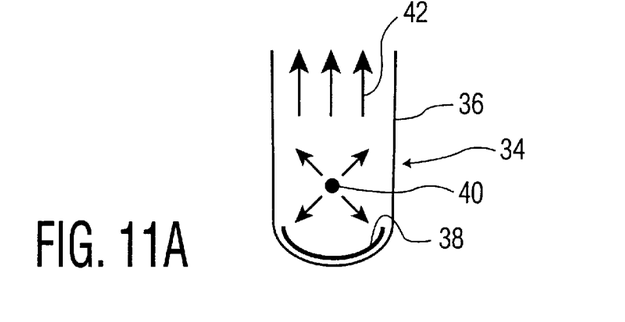
FIG. 11A shows a collimated light source including a hemispherical mirror for an embodiment of the invention.
Figure 11B:
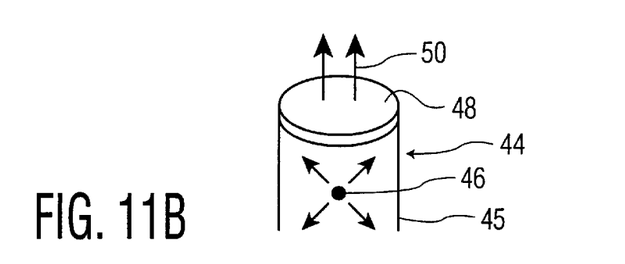
FIG. 11B shows a light source including a lens for focusing and collimating emitted light for an embodiment of the invention.
Figure 12A:
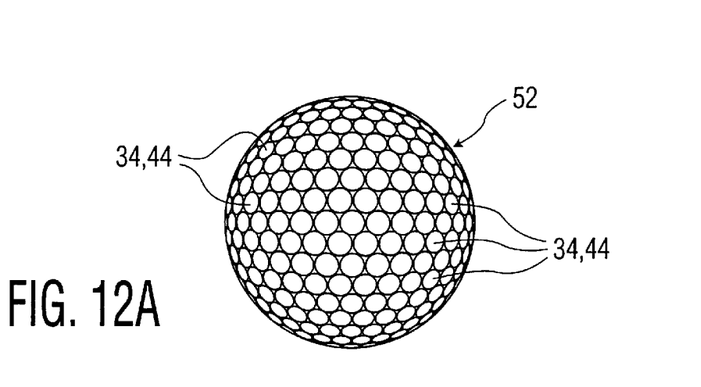
FIG. 12A shows a directionally modulated pixel including a plurality of separate collimated elements from either of the embodiments of FIGS. 11A or 11B, or otherwise.
Figure 12B:
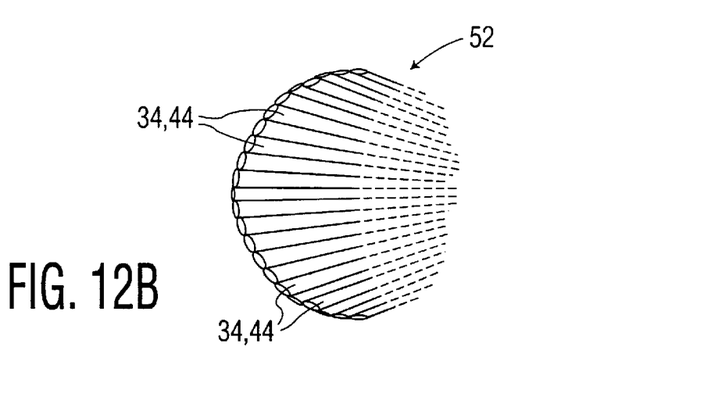
FIG. 12B is a side elevational view of a cutaway portion of the directionally-modulated pixel of FIG. 12A.

In the embodiments of the invention previously described, it was indicated that a directionally modulated pixel could be formed from a point source of light in conjunction with a plurality of modulation regions through which the light would pass and be modulated. Alternatively, a DMP may be formed from a collection of separately controlled, differently directed collimated light sources, with no need for a modulation surface to subsequently modulate the visual properties of the light, which would already be different in each direction. In FIG. 11A, a collimated light source 34 is provided by a microminiature tubular housing 36 containing a hemispherical mirror 38 in its bottom portion, with a point source of light 40 being centrally located an appropriate distance above the mirror 38 for causing collimated light 42 to be emitted by the light source 34. Alternatively, in another embodiment as shown in FIG. 11B, a collimated light source 44 is provided by a tubular device having a point source of light 46 located therein as shown, whereby the light from the point source of light 46 is focused by a lens 48 at an open end of a tubular housing 45, for transmitting collimated beams of light 50 therefrom, as shown. Microminiature collimated light sources, such as 34 or 44, for another embodiment of the invention, can be assembled into a hemispherical array of such elements as shown in the perspective view of FIG. 12A, for providing a directionally modulated pixel 52. A cutaway side elevational view of an interior portion of the DMP 52 is shown in FIG. 12B. The light from the point source 40, 46 in the collimated light elements 34, 44, respectively, can be generated directly within the respective collimated light element or can be generated in another location and transported to the collimated light element using fiber optics or other means. The collimation of each element of the DMP 52 will be arranged so that each element emits light in a different direction, and therefore any particular observer will see light in a different direction, and therefore any particular observer will see light from only one of the collimated light elements, 34 or 44, thus allowing the DMP 52 to emit nonuniform light having different properties in different directions. The choice between the use of different embodiments of a DMP 14 or 52 may be made based on construction cost and suitability for a given application.

Several information processing methods may be used by the control system to determine the appropriate modulation for the DMPs 14, 52 in order to display a given scene. The control system may use conventional computer graphics approaches such as ray-tracing in conjunction with internal data modeling the 3D scene. Alternatively, or in conjunction, a set of different recorded views of an actual scene from one or several cameras or other recording devices may be used by the control system to determine suitable modulation for the DMPs.

A more detailed configuration for an IDD will now be described. An image display device (IDD) 12 consisting (in this example) of a rectangular array (see FIGS. 4A, 4B) of a large number of directionally-modulated pixels 14 (DMPs), can for example include 500 rows having 500 individual DMPs 14 in each row. Each DMP 14 consists of a point source of light 15 in the center of a small hemispherical liquid crystal modulation surface 18 (2mm in diameter) divided as shown in FIG. 4D into numerous modulation regions 16, say 400 evenly distributed over the hemisphere 18, for example. The transparency of each liquid crystal modulation region 16 can be independently controlled to make it opaque or transparent, for example, using standard electronic control methods as used in conventional liquid crystal displays. In this particular example, let the point source of light 15 of each individual DMP 14 be the end of an optical fiber carrying light from a powerful incandescent common light source.

Figure 13:
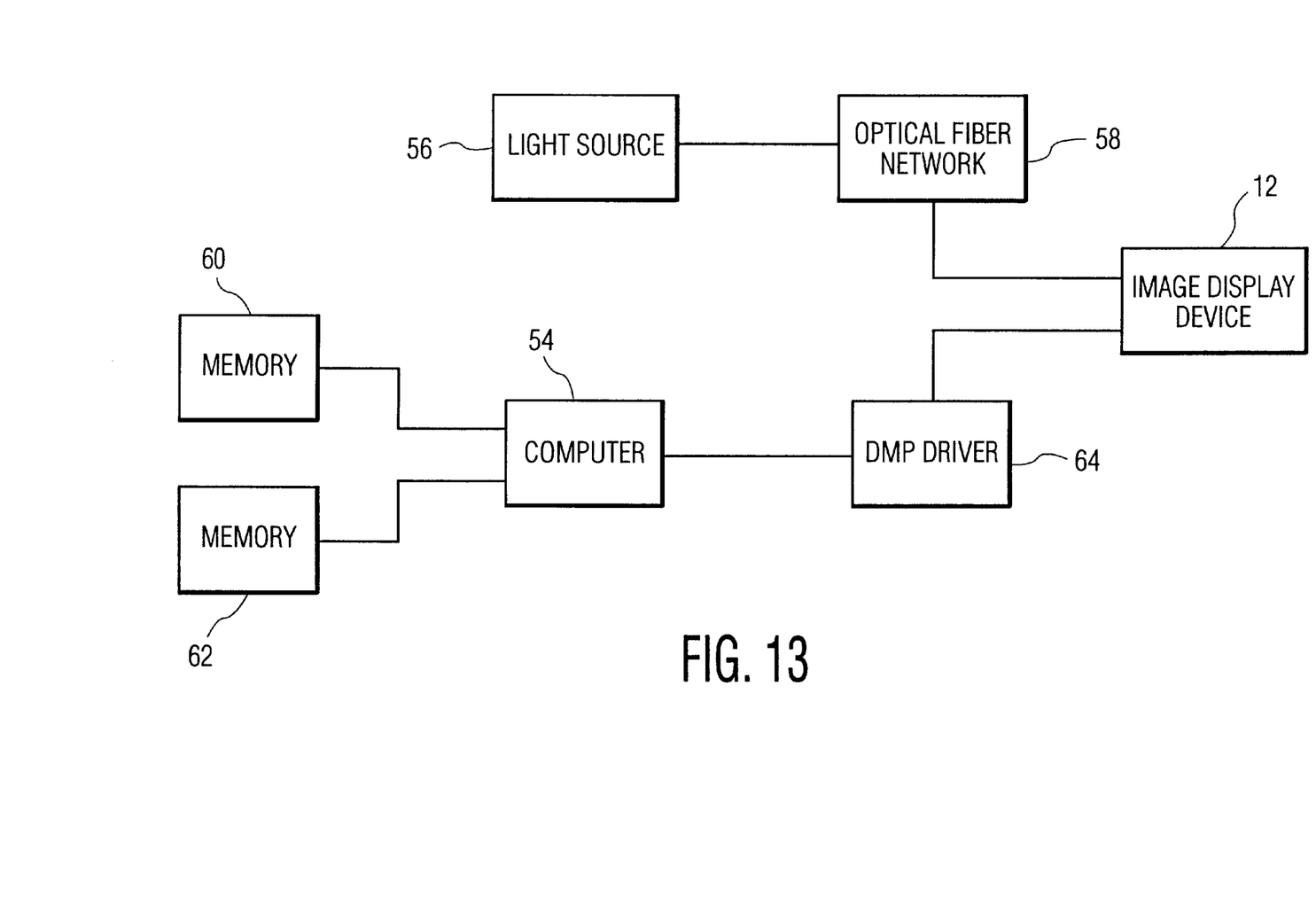
FIG. 13 shows a block schematic diagram of an image display system including a display formed from an array of directionally-modulated pixels, for an embodiment of the invention.

Apparatus for controlling the IDD 12 is shown in FIG. 13. As previously mentioned, each DMP 14 is a tiny liquid crystal screen 18 which can be electronically controlled by a computer just as conventional liquid crystal screen is controlled. In the present system for a 3D image display, each of the DMPs 14 in the IDD 12 is simultaneously connected to the controlling computer 54. This computer 54 is programmed to execute either Algorithm 1 shown in FIG. 14, or Algorithm 2 shown in FIG. 15, for driving IDD 12 to display a desired 3D image.

With further reference to FIG. 13, the apparatus for controlling the IDD 12 includes a light source 56, which in this example is expected to be capable of producing 5000 lumens of light. The light emitted from the light source 56 is coupled to an optical fiber network 58 for providing light to the optical fibers (not shown) providing the point sources of light 15 to each one of the digitally modulated pixels 14 of the image display device 12. It is expected that the IDD 12 will include an array of 500×500 DMPs in the X and Y coordinates, for a total number of DMPs 14 of 250,000. It is further expected that each DMP 14 will be 2 mm (millimeters) in diameter, and each will have 400 modulation regions 16. Accordingly, the IDD 12 will include 100 million modulation regions 16.

With still further reference to FIG. 13, the apparatus also includes a Memory 60 for storing computer data structures representing a 3D scene. It is estimated that the Memory 60 will have a storage capacity of from 100 megabytes to 10 gigabytes. The control system or apparatus may also include another memory 62 for storing 2D camera images recorded from multiple view points. Algorithm 1 of FIG. 14, as described below, provides programming for utilizing the data from Memory 60, whereas Algorithm 2 of FIG. 15, as described below, programs computer 54 for processing image data from memory 62, each to drive the IDD to produce 3D images. The computer 54, which can also be a central processing unit or microprocessor, controls a DMP Driver 64 to provide individual control voltages to each modulation region 16 of each DMP 14 of IDD 12. Depending upon the particular application, the DMP Driver 64 may include several layers of multiplexing.

Figure 14:
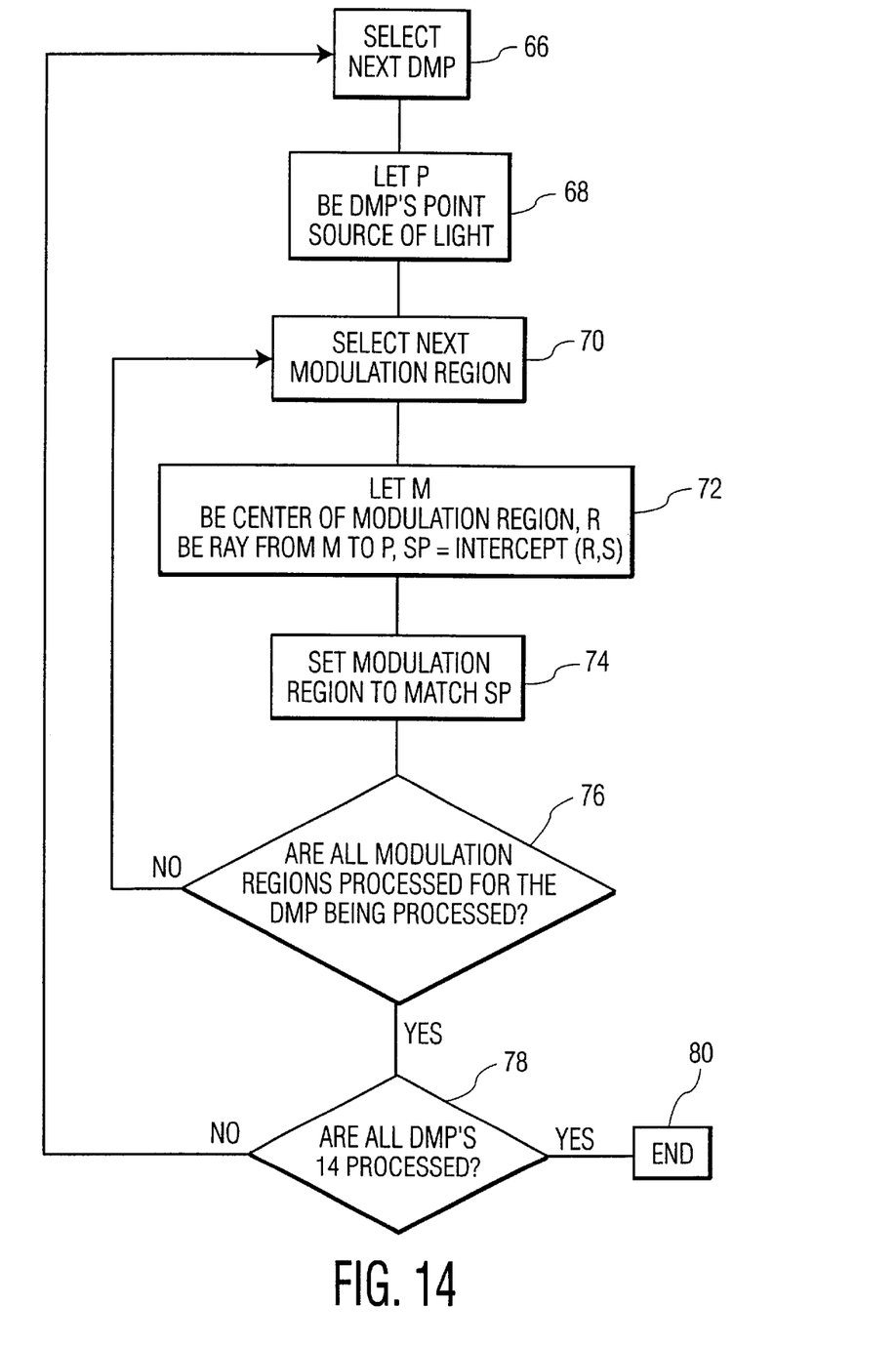
FIG. 14 shows a flowchart of an algorithm or program for programming a computer to drive an image display device of directionally-modulated pixels using digitally encoded three-dimensional scenes, for an embodiment of the invention.

With reference to FIG. 14, the various programming steps provided by Algorithm 1 will now be described. There exist many well-known methods for representing 3D scenes as computer data structures. Let S be a data structure representing a 3D scene. The standard mathematical term "ray" refers to a geometrical entity having a starting point and a direction. In the following algorithm assume the availability of a computational function intercept (R,S), which identifies the point where a ray R first intercepts a scene S. There exist many well-known methods for computing such an intercept. One such method is called "ray tracing". Note that it is assumed that geometrical coordinates of the IDD 12 and the 3D scene have been transformed to be in a common coordinate system.

Algorithm 1:

For each directionally modulated pixel (DMP) 14 in the image display device (IDD) 12, select the next DMP 16 in Step 66.

Let P be DMP's point source of light via step 68.

Select the next modulation region in Step 70.

Let M be the spatial coordinates of the center of the modulation region in Step 72.

Let R be the unique ray with starting point M passing through point P, in Step 72.

Let SP be the point intercept (R,S), in Step 72.

Action: Set the modulation properties of the current modulation region of the current DMP 14, to correspond to the visual properties of point SP of the 3D scene, in Step 74. Repeat via decision step 76, steps 70–74 until all modulation regions 16 of a current DMP 14 have been processed, and then proceed to step 78 to determine if all DMPs 14 have been processed. If not, proceed to step 66 to select the next DMP 14 for processing. If all DMP's have been processed, proceed to the termination or "End" step 80.

Figure 15:
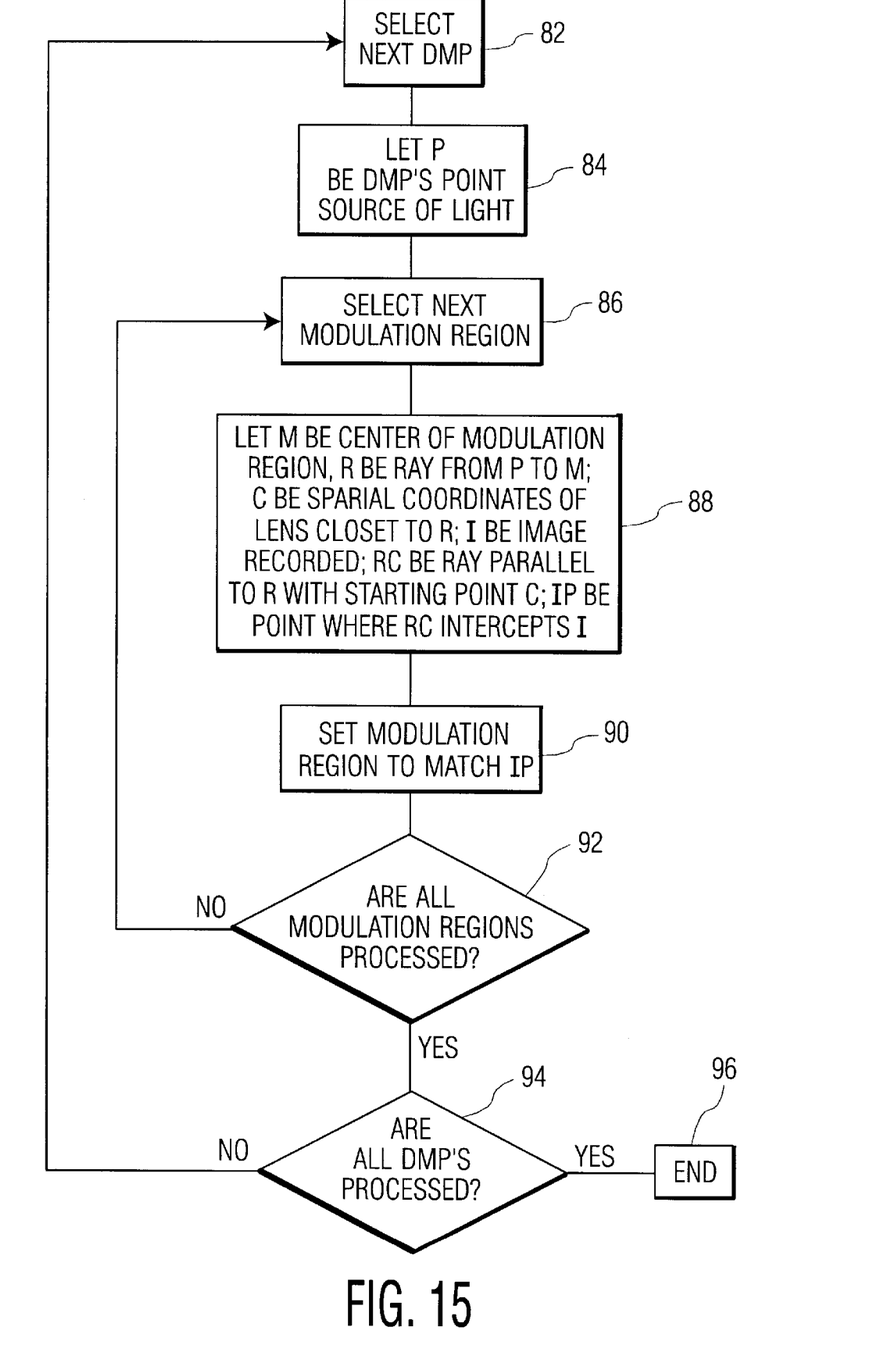
FIG. 15 shows another algorithm for another embodiment of the invention for programming a computer or controller to process stored two-dimensional camera images recorded from multiple viewpoints to drive an image display device of an array of directionally-modulated pixels, for another embodiment of the invention.

The steps associated for programming computer 54 via Algorithm 2 will now be described with reference to FIG. 15. Through use of Algorithm 2, a 3D image is displayed on IDD 12 as derived from the set of 2D image data previously recorded by cameras, and stored in Memory 62. The first Step 82 is to select the first or a next DMP 14 for processing. Next, in Step 84, P is designated as the spacial coordinate of the point source of light 15 of the DMP 14 being processed. Next, in Step 86 either the first or the next modulation region 16 of the DMP 14 being processed is itself selected for processing. Next, in Step 88, M is assigned to be the spacial coordinates of the center of the modulation region, R the unique ray with starting point P passing through point M, and C is assigned to be the spacial coordinates of the center of the lens (not shown) of the camera (not shown) closest to ray R. Also in Step 88, I is assigned to be the image recorded by the camera; RC is assigned to designate a ray parallel to R with starting point C; and IP is assigned to be the point where the ray RC intercepts the camera image I.

Next, in Step 90, the modulation region is set to match IP. Next in Step 92, a decision step, it is determined whether all modulation region 16 of the DMP 14 being processed have themselves been processed. If not, Steps 86 through 90 are repeated. If the answer is Yes, that all modulation regions 16 of the DMP 14 have been processed, then decision Step 94 is entered for determining whether all DMPs 14 have been processed. If not, Step 82 is re-entered; if so, termination of Step 96 is entered.

The apparatus and programming described above are for a preferred embodiment of the invention. Similar apparatus and programming can be used for any embodiment of the invention, and are not meant to be limiting.

The description of the system suggests that computations occur at the time 3D images are displayed. However, all computations to display a given set of 3D scenes can be done in advance and stored for later playback. For example, if a DMP has 400 modulation regions as in the example above, typically 400 times as much storage will be needed a compared to a recording for conventional display, so for example a standard 6-hour video tape would be able to store 54 seconds of 3D video. This should not be a problem in practice as storage density is undergoing rapid technological advances.

Although various embodiments of the invention have been shown and described herein, they are not meant to be limiting. Those of skill in the art may recognize various modifications to these embodiments, which modifications are meant to be covered by the spirit and scope of the appended claims. For example, the intensity of the light from each light source, or point source of light, can in the various embodiments be varied for enhancing the light modulating process, and resolution of the system. Also, where LCD modulation region are employed as previously described, the light transmissions characteristics of each region can be modulated between transparent and opaque transmission to control the properties or percentage of total light transmitted.

What I claim is:

1. A method for displaying a realistic three-dimensional image, comprising the steps of:

arranging a plurality of picture elements into a closely spaced array thereof, wherein each one of said plurality of picture elements represents an individual pixel of a displayed image, and each is controllable for emitting light; and directionally modulating the light emitted from each one of said plurality of picture elements or pixels, for independently controlling the visual properties of light emitted therefrom traveling in each one of a plurality of directions, respectively, to match the visual properties of light passing through corresponding points in corresponding ones of the plurality of directions, respectively, relative to the actual three-dimensional scene being displayed.

2. The method of claim 1, wherein said step of directionally modulating the light emitted from each one of said plurality of picture elements includes the steps of:

forming each of said plurality of picture elements from a source of light, and a modulation surface at least partially surrounding and in close proximity to its associated source of light, respectively;

dividing each said modulation surface into a plurality of individually controllable modulation regions; and controlling the light transmission characteristics of each of said plurality of modulation regions for displaying a desired 3D image.

3. The method of claim 2, wherein said source of light consists of one of a light emitting diode, a laser diode, and an optical fiber carrying light from a common light source.

4. The method of claim 2, wherein said source of light is a common light source backlighting all of a plurality of said modulation surfaces.

5. The method of claim 3, wherein said common light source is one which emits incoherent light.

6. The method of claim 3, wherein said common light source is one which emits coherent light.

7. The method of claim 4, further including the step of:

insisting an opaque baffle positioned between said common light source, and said plurality of said modulation surfaces;

forming a plurality of pin holes through said opaque baffle, with each one of said plurality of pin holes being centered with an associated one of said plurality of said modulation surfaces, thereby providing point sources of light for the latter.

8. The method of claim 2, wherein each said modulation surface is substantially hemispherical in shape.

9. The method of claim 8, further including the steps of:
positioning said source of light in a central portion of its associated said modulation surface.

10. The method of claim 8, further including the step of making each one of said plurality of individually controllable modulation regions from LCD material.

11. The method of claim 2, wherein each said plurality of individually controllable modulation regions are arranged successively in a horizontal row of adjacent individual modulation regions, respectively, each of which is vertically elongated.

12. The method of claim 11, wherein each said modulation surface has an arcurate horizontal cross section, and is formed between top and bottom surfaces of its associated one of said plurality of picture elements.

13. The method of claim 11, wherein each said modulation surface is rectangular.

14. The method of claim 12, further including the steps of:
forming a layer of opaque material on the top and bottom surfaces of each said picture element;
stacking a plurality of said picture elements vertically to form a column thereof; and
placing a plurality of said columns of individual ones of said picture elements in juxtaposition to one another to form said array from successive columns and rows of said modulation surfaces.

15. The method of claim 2, further including the steps of:
forming each one of said plurality of picture elements to have a cubical configuration, with said modulation surface being the front thereof, and having top, side, bottom, and rear surfaces, thereof.

16. The method of claim 15, further including the steps of:
forming a layer of opaque material on the top, side, bottom, and rear surface of each said cubical light-emitting picture element; and
placing a plurality of said cubical light emitting picture elements adjacent to and stacked upon one another to form X rows and Y columns thereof for said array.

17. The method of claim 2, further including the steps of:
providing said source of light as a single point source of light.

18. The method of claim 2, further including the step of:
providing said source of light from individual red, green, and blue point sources of light.

19. The method of claim 18, further including the step of:
multiplexing said red, green, and blue point sources of light for activating only one of the three at a given time, in a manner providing a color display.

20. The method of claim 1, further including the steps of:
forming each one of said plurality of picture elements from a plurality of collimated sources of light, respectively; and
arranging each one of said plurality of collimated sources of light into a hemispherical configuration, whereby each one of said plurality of collimated sources of light are controllable for selectively emitting light in a different direction relative to any other one thereof, respectively.

21. The method of claim 20, wherein said step of directionally modulating the light emitted from each one of said plurality of picture elements or pixels, further includes the steps of:
controlling the intensity of light transmitted from each one of said plurality of collimated sources of light of each one of said plurality of light-emitting picture elements, respectively.

22. The method of claim 1, further including the steps of:
forming said array of said plurality of picture elements into an outer circular wall configuration, whereby observers are located outside the wall.

23. The method of claim 1, further including the steps of:
forming said array of said plurality of picture elements on the interior walls of a circular room, whereby observers are located within said room.

24. The method of claim 1, further including the steps of:
forming said array of said plurality of light-emitting picture elements into a spherical configuration, with said array being on the outside of the associated sphere.

25. The method of claim 2, wherein said plurality of individually controllable modulation regions each consist of liquid crystal material.

26. The method of claim 11, wherein said plurality of individually controllable modulation regions each consist of liquid crystal material.

27. The method of claim 2, wherein said plurality of individually controllable modulation regions each have substantially the same shape and dimensions.

28. The method of claim 2, wherein said plurality of individually controllable modulation regions are each rectangular in shape.

29. The method of claim 8, wherein said plurality of individually controllable modulation regions are each rectangular in shape.

30. The method of claim 8, wherein said plurality of individually regions controllable modulation regions each have substantially the same shape and dimensions.

31. The method of claim 20, wherein said plurality of collimated sources of light each have substantially the same shape and dimensions.

32. An image display system, comprising:
an array of a plurality of pixels;
each pixel of said plurality of pixels including:
a source of light;
a modulation surface enclosing at least a portion of said source of light,
said modulation surface being divided into a plurality of modulation
regions; and
a control mechanism operable for controlling each one of said plurality of modulation regions of said plurality of pixels, respectively, at any given time for selectively modulating the visual properties of light emitted therefrom traveling in each one of a plurality directions respectively, for providing a realistic three dimensional (3D) image of desired scene.

33. A three-dimensional (3D) image display system, comprising:
an array of a plurality of pixels, each of which emit light in a plurality of directions, said plurality of pixels being closely spaced to one another, each of said plurality of pixels being controllable for modulating the light in each one of the associated plurality of directions, respectively; and
a controller operable for controlling each one of said plurality of pixels, for selectively modulating the visual properties of light emitted therefrom traveling in each of the plurality of directions, respectively, for providing a realistic 3D image of a desired scene to observers located at Myriad different observation positions relative to said image display.

34. The image display system of claim 33, wherein each pixel of said plurality of pixels, includes:

a source of light; and a modulation surface enclosing at least a portion of said source of light, said modulation surface being divided into a plurality of modulation regions each associated with one direction of the plurality of directions for emitted light, respectively, each controllable by said controller for changing the light transmission characteristics thereof, respectively, as required at any given time for presenting a desired 3D image.

35. The image display system of claim 34, wherein said source of light consists of one of a light emitting diode, a laser diode, and an optical fiber carrying light from a common light source.

36. The image display system of claim 34, wherein said source of light is a common light source backlighting all of a plurality of said modulation surfaces.

37. The image display system of claim 35, wherein said common light source is one which emits incoherent light.

38. The image display system of claim 35, wherein said common light source is one which emits coherent light.

39. The image display system of claim 36, further including:

an opaque baffle positioned between said common light source, and said plurality of said modulation surfaces, with plurality of pin holes being located through said baffle with each centered with an associated one of said plurality of said modulation surfaces for providing point sources of light therefore, respectively.

40. The image display system of claim 33, wherein each said modulation surface is substantially hemispherical in shape.

41. The image display system of claim 40, wherein said source of light is positioned in a central portion of its associated said modulation surface.

42. The image display system of claim 40, wherein each one of said plurality of individually controllable modulation regions consists of LCD material.

43. The image display system of claim 33, wherein said source of light is a single point source of light.

44. The image display system of claim 33, wherein said source of light includes red, green, and blue point sources of light.

45. The image display system of claim 33, wherein each one of said plurality of modulation regions of said modulation surface consists of a Liquid Crystal Device (LCD), respectively.

46. The image display system of claim 33, wherein each said modulation surface has an arcuate horizontal cross section, a top surface, and bottom surface, and each of said plurality of modulation regions associated therewith is vertically elongated, whereby a plurality of said modulation surfaces are vertically stacked into juxtaposed columns, respectively, for forming said image display.

47. The image display system of claim 46, further including opaque material formed on the top and bottom surfaces of each said modulation surface.

48. The image display system of claim 34, wherein each of said plurality of pixels include:

a front face consisting of said modulation surface; and a top, bottom, right, and left sides, forming a cubical configuration with said front face;

said source of light being centrally located therein.

49. The image display system of claim 33, wherein each pixel of said plurality of pixels, includes:

a plurality of microminiaturized collimated light source devices.

50. The image display system of claim 49, wherein said plurality of microminiaturized collimated light source devices are connected together into a partial spherical configuration.

51. The image display system of claim 33, further including said array of a plurality of pixels located on the outside walls of a circular configuration.

52. The image display system of claim 33, further including said array of a plurality of pixels located on inside walls of a circular configuration.

53. The image display system of claim 33, further including said array of a plurality of pixels formed as an outer surface of a portion of a sphere.

* * * * *